United States Patent
Elkehag

(10) Patent No.: US 10,070,248 B2
(45) Date of Patent: Sep. 4, 2018

(54) MOVEMENT DETECTION

(71) Applicant: STILLA, INC., San Francisco, CA (US)

(72) Inventor: Elin Elkehag, San Francisco, CA (US)

(73) Assignee: STILLA, INC., San Francisco, CA (US)

( * ) Notice: Subject to any disclaimer, the term of this patent is extended or adjusted under 35 U.S.C. 154(b) by 0 days.

(21) Appl. No.: 15/269,737

(22) Filed: Sep. 19, 2016

(65) Prior Publication Data

US 2017/0086015 A1 Mar. 23, 2017

Related U.S. Application Data

(60) Provisional application No. 62/220,892, filed on Sep. 18, 2015.

(51) Int. Cl.
| | |
|---|---|
| *G08B 1/08* | (2006.01) |
| *H04W 4/00* | (2018.01) |
| *G08B 13/08* | (2006.01) |
| *G08B 13/14* | (2006.01) |
| *G08B 21/02* | (2006.01) |
| *G08B 25/08* | (2006.01) |
| *H04W 4/80* | (2018.01) |
| *G08B 6/00* | (2006.01) |

(52) U.S. Cl.
CPC .......... *H04W 4/008* (2013.01); *G08B 13/08* (2013.01); *G08B 13/1427* (2013.01); *G08B 13/1436* (2013.01); *G08B 21/0216* (2013.01); *G08B 21/0227* (2013.01); *G08B 21/0252* (2013.01); *G08B 21/0272* (2013.01); *G08B 21/0291* (2013.01); *G08B 21/0294* (2013.01); *G08B 25/08* (2013.01); *H04W 4/80* (2018.02); *G08B 6/00* (2013.01)

(58) Field of Classification Search
CPC ... H04W 4/008; G08B 13/08; G08B 13/1427; G08B 13/1436; G08B 21/0216; G08B 21/0227; G08B 21/0252; G08B 21/0272; G08B 21/0291; G08B 21/0294; G08B 25/08; G08B 6/00; G06K 2017/0045
See application file for complete search history.

(56) References Cited

U.S. PATENT DOCUMENTS

| | | | | |
|---|---|---|---|---|
| 8,810,392 | B1* | 8/2014 | Teller | G08B 21/24 235/385 |
| 9,330,558 | B2* | 5/2016 | Logan | A41D 1/002 |
| 2006/0238347 | A1* | 10/2006 | Parkinson | G08B 13/1436 340/572.4 |
| 2011/0210849 | A1* | 9/2011 | Howard | G08B 13/1427 340/539.32 |
| 2012/0293330 | A1* | 11/2012 | Grant | G08B 13/1427 340/568.8 |
| 2014/0173439 | A1* | 6/2014 | Gutierrez | G08B 21/24 715/727 |

(Continued)

*Primary Examiner* — Joseph Feild
*Assistant Examiner* — Rufus Point
(74) *Attorney, Agent, or Firm* — Maschoff Brennan

(57) ABSTRACT

A motion sensing device includes an attachment mechanism configured to quickly and easily attach to an object, a motion detector configured to detect motion of the object, a short-range wireless communication component configured to communicate motion information related to the detected motion, and an indicator.

20 Claims, 13 Drawing Sheets

(56) References Cited

U.S. PATENT DOCUMENTS

| | | | | |
|---|---|---|---|---|
| 2014/0188638 A1* | 7/2014 | Jones | ...................... | H04W 4/60 |
| | | | | 705/16 |
| 2014/0370917 A1* | 12/2014 | Buchheim | ............. | H04W 4/026 |
| | | | | 455/456.1 |
| 2015/0156567 A1* | 6/2015 | Oliver | .................... | H04W 4/80 |
| | | | | 340/870.07 |
| 2015/0221194 A1* | 8/2015 | Sarkar | ................ | G08B 13/2465 |
| | | | | 340/870.16 |
| 2015/0371511 A1* | 12/2015 | Miller | ..................... | G01S 19/16 |
| | | | | 340/545.6 |
| 2016/0071397 A1* | 3/2016 | Logan | .................... | A41D 1/002 |
| | | | | 340/687 |
| 2016/0330593 A1 | 11/2016 | Caperell | | |
| 2017/0086610 A1* | 3/2017 | Ross | ................. | A47G 19/2227 |

* cited by examiner

MOVEMENT DETECTION

RELATED APPLICATION

This application claims the benefit under 35 U.S.C. § 119(e) of U.S. Provisional Application No. 62/220,892, filed Sep. 18, 2015.

FIELD

The embodiments described herein relate generally to motion sensing, and more particularly to a sensor system to detect movement of any object.

BACKGROUND

People often have difficulty keeping track of things in their lives. For example, people often lose or misplace their possessions such as wallets, computers and bags. In some instances, people lose their possessions to thievery. This problem also exists for larger objects such as bikes, baby strollers, even cars, etc., which can be stolen when the owner is not paying attention or when the owner leaves the object unattended. Further, it may be difficult to detect a break-in, especially when a robber can surreptitiously enter a building through a window. In addition, some hearing-impaired individuals may be unable to hear a door bell, a knock on a room door or window, or even if a door or window is being opened. Tracking the movements of people can also present problems. For example, it may be difficult to track the movement of a person under medical, or other observation or care.

There are a variety of conventional devices and systems designed to indicate movement of an object or person. Such devices, however, often include complex sensor packages that, may include barometric pressure sensors that detect a change in pressure as a proxy for movement. Conventional home care equipment often includes bulky and expensive equipment for detecting movements when someone wakes up and puts their feet on the floor, or alerts the caregiver when a cared for person falls out of their bed. Other conventional sensor devices primarily only use scales to detect up and down movement, as well as providing an alert when an object has traveled a certain distance, moved outside of a set location (or geofence) or when an object has mistakenly been left behind.

Many conventional systems involve the installation of permanent movement sensors on or around an object of concern to act as a warning of movement of such object; however, these sensors are impractical in the traveling scenario and are exceptionally expensive and cumbersome in the case of the impaired hearing individual and care equipment.

The subject matter claimed herein is not limited to embodiments that solve any disadvantages or that operate only in environments such as those described above. Rather, this background is only provided to illustrate one example technology area where some embodiments described herein may be practiced.

SUMMARY

Systems and methods for a light-weight, inexpensive motion detecting system are described herein. According to one aspect, a system for motion detection includes a motion sensing device, the motion sensing device including an attachment mechanism configured to quickly and easily attach to an object, a motion detector configured to detect motion of the object, a short-range wireless communication component configured to communicate motion information related to the detected motion, and an indicator. The motion sensing device may communicate with a paired device. The paired device may include a short range wireless communication component configured to receive the motion information, and a sensing algorithm configured to determine whether the motion is associated with an alarm condition.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The embodiments described herein relate to systems and methods for detecting movement of any object, examples of which include but are not limited to: doors, windows, bags, rugs and the like and notifying occupants or owners of such movement. Alternatively, the systems and methods described can be used to track the movement of an individual. In at least one embodiment, movement of an individual may be tracked through monitoring movement of a door, carpet, stroller, etc.

The embodiments described herein involve the use of a motion sensing device that includes a motion detection sensor. The motion sensing device can be small, e.g., the size of a button and can be battery powered, e.g., by a lithium-ion battery. The motion sensing device may include an attachment mechanism for quickly attaching the motion sensing device to the individual or an object of interest. The motion sensing device(s) can further include a user interface that may be used to provide alerts or other information.

These and other embodiments are described with reference to the appended figures. In the figures, like numbers generally correspond to like structures unless indicated otherwise.

Figure 1A:
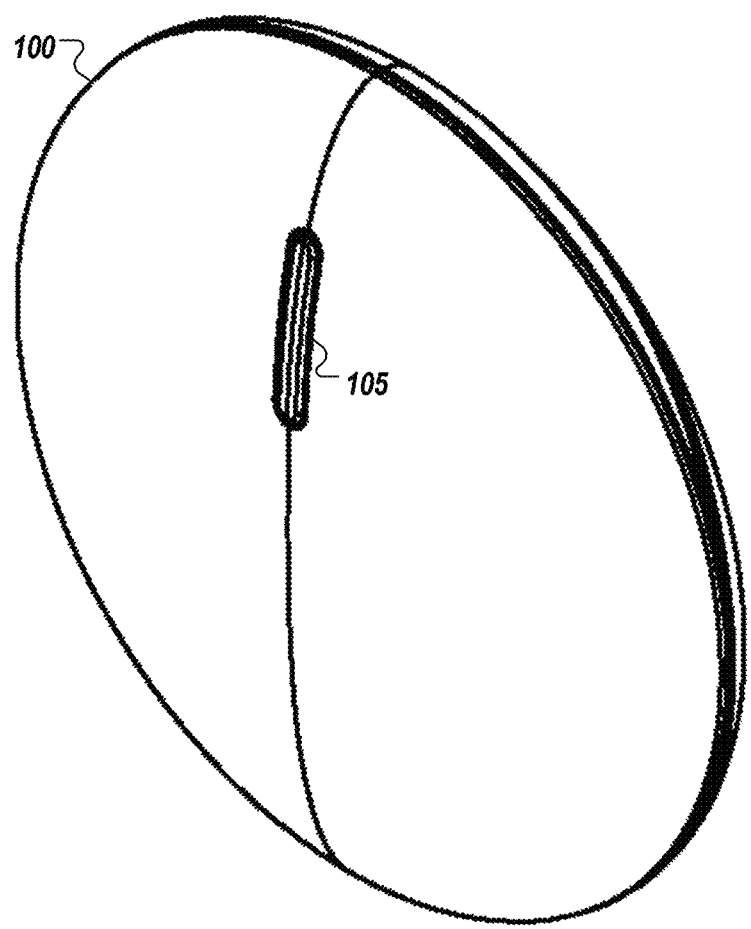
FIG. 1A is a diagram illustrating one example embodiment of a motion sensing device.

FIG. 1A illustrates one example embodiment of a motion sensing device 100. The motion sensing device 100 may be button shaped, and the bottom surface may be slightly concave with an indicator 107. The indicator may include a light-emitting diode (LED) that may emit light through in or through any shape (e.g., a vertical elongate ellipse), on a top portion of the motion sensing device 100. The indicator 107 can light up in order to inform users as to a state of the motion sensing device 100, e.g., on, off, Bluetooth pairing, alert status, etc. The motion sensing device 100 can include a motion detection component, such as an accelerometer, gyroscope, or other motion detection hardware and/or software. The motion sensing device 100 can also include a power supply (e.g., a battery), a wireless communication component, the indicator 107 output, audio output, and an attachment mechanism(s). The motion sensing device 100 can also use any chipset that is compatible for use with one or both of accelerometers and gyroscopes. These components of the motion sensing device 100 are further described below.

The motion sensing device 100 can be any color and texture and may have a functional design that makes it possible to attach the motion sensing device 100 to an object (e.g., a surface of a door or a window) in a smooth and secure way. The motion sensing device 100 may be made from (either partially, wholly, or in any combination) any material, such as plastic, rubber, metal, fiberglass, carbon fiber, glass, and the like providing for various colors, textures, and finishes. The motion sensing device 100 may be painted, chemically coated or colored, anodized, etched, etc.

The attachment mechanism, for example, can include one or more of easy-to-apply Velcro®, double sided tape or other such sticky material, a mechanical pinch-type attachment, a needle or pin, and/or a pin-hole. The quick attach mechanism, or combination of mechanisms may enable the motion sensing device 100 to be readily adaptable between various objects, such as doors, windows, rugs, purses, bags, luggage, strollers, skis, golf clubs, tool boxes, equipment, jackets and clothing, iPads, laptops, cameras, keys, household cabinets, drawers, storage jars, and the like. With such adaptability for attachment, users can focus on tasks at hand without worrying about the object's theft, unauthorized access, unknown use, forgetful neglect, misplacement, and the like. For example, if a child tries to take a cookie from a cookie jar before dinner, the motion sensing device 100 may alert a mother or father that the cookie jar was opened while the parent(s) were occupied preparing the meal. In another example, a user working in an open office space can be assured that during a coffee break, tampering with the user's laptop and documents does not occur. In another example, a user can be assured that an elderly parent or young child did not forget to take their medication when alerted a medicine bag was grabbed. In another example, a user can be notified if a child's door is opened or if the user's hotel room is accessed. These examples are non-limiting, and other similar embodiments are contemplated.

Figure 1B:
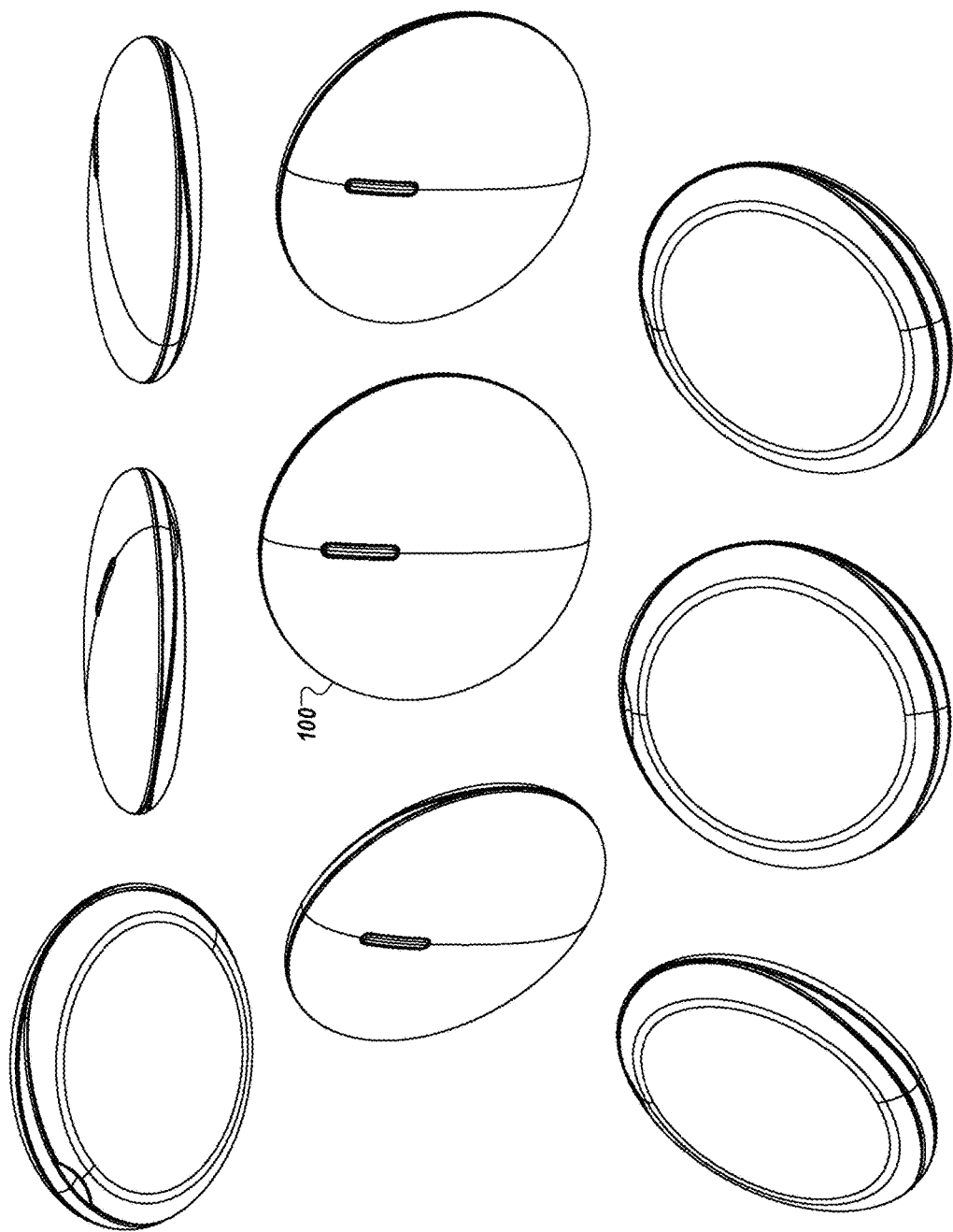
FIG. 1B is a diagram illustrating multiple perspective views of the motion sensing device in FIG. 1A.
Figure 1C:
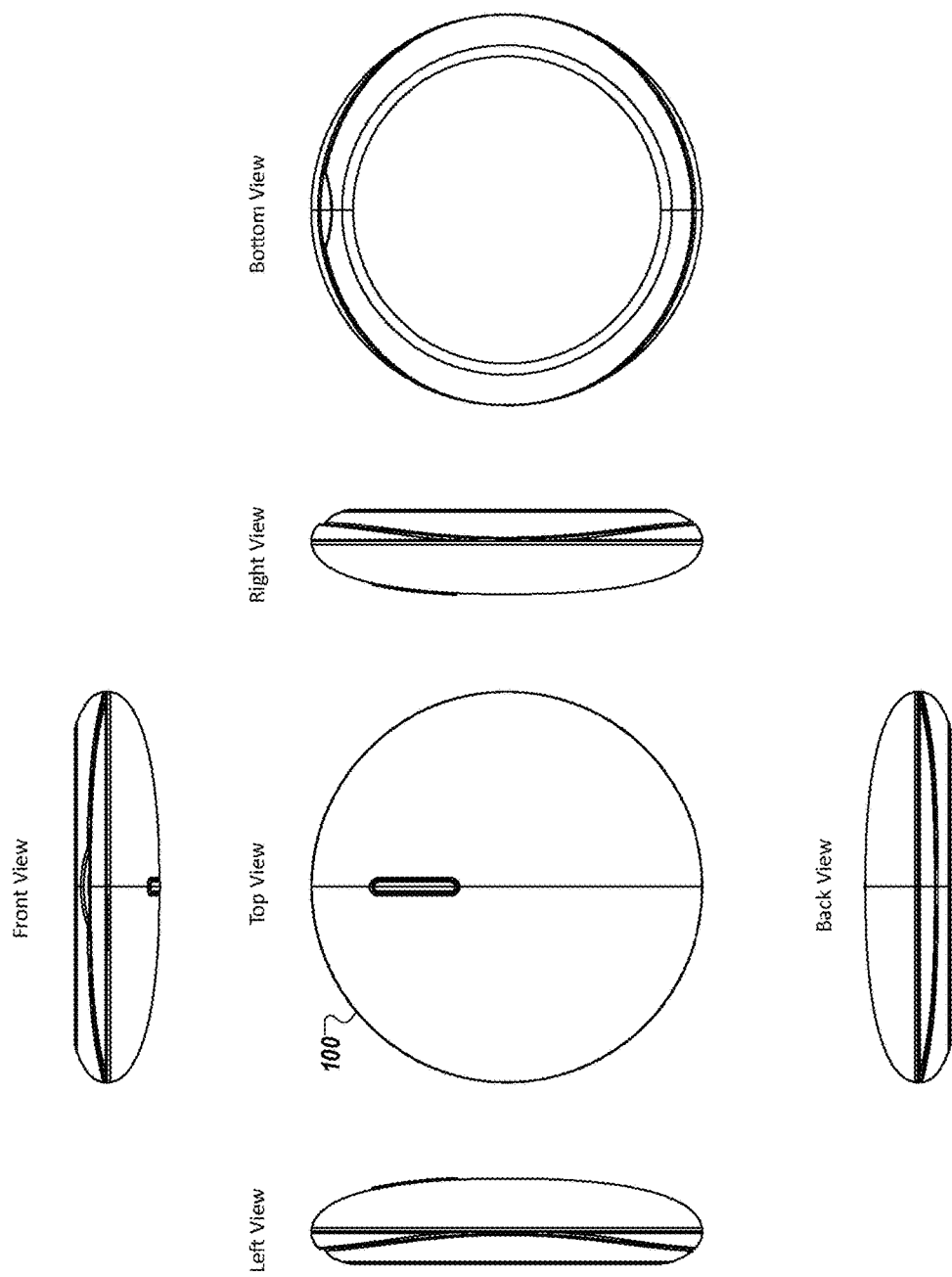
FIG. 1C is a diagram illustrating an orthographic view of the motion sensing device in FIG. 1A, including (from left to right and top to bottom) a left side view, a front view, a top view, a back view, a right side view, and a bottom view.

FIGS. 1B and 1C illustrate embodiments of the motion sensing device 100 according to orthogonal and perspective views, respectively.

Figure 1D:
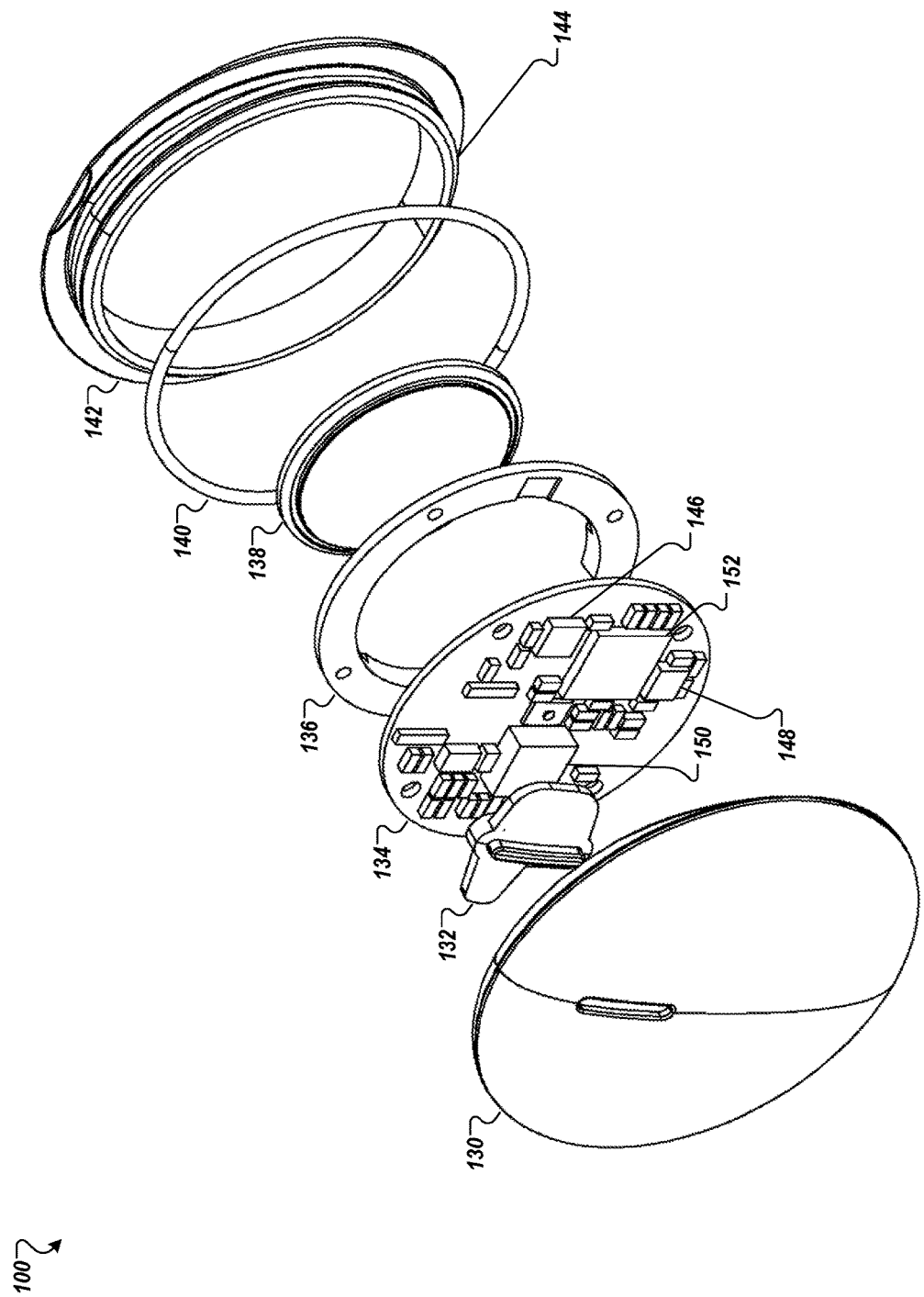
FIG. 1D is a diagram illustrating an exploded view of the motion sensing device in FIG. 1A.

FIG. 1D illustrates an exploded view of an example embodiment of the motion sensing device 100, illustrates additional components including, for example, a top cover 130, a diffuser 132, a printed circuit board assembly (PCBA) 134, a battery slot 136 for a battery 138, an O-ring gasket 140, and a bottom cover 142 with mating features 144 that are shaped to mate with corresponding mating features of the top cover 130. In some embodiments, a memory chip 146, a motion detection component 148, a communication component 150, and a processor 152 are part of the PCBA 134. In at least one embodiment, the top cover 130 and the bottom cover 142 form a case. The case may substantially encase the motion detection component 148, the communication component 150, and the indicator 107. A footprint of the case may be smaller than one square inch. In at least one embodiment, the footprint of the case is a circular shape with a radius less than one inch. In at least one embodiment, the footprint of the case is an oval or oblong shape with a major radius less than one inch.

The motion sensing device 100 may receive input such that it is configured to detect movement of an object via the motion detection component 148. Such movement triggers an electrical signal that may be transmitted via the communication component 150, (e.g., Bluetooth Low Energy module), to a previously configured application running on a paired device and, in certain embodiments, to a server. The communication component 150 may include a component that may connect to other components and devices wirelessly and/or via a wired connection.

The motion sensing device 100 may include one or more sensors to detect information pertaining to the user of the motion sensing device 100, an environment in which the motion sensing device 100 is situated, etc. The one or more sensors may include at least one of a clock, camera, microphone, gyrometer, gyroscope, accelerometer, infrared sensor, global positioning system (GPS), near-field communication (NFC) sensor, brightness sensor, proximity sensor, compass, thermometer, step counter, or fingerprint sensor, etc.

Figure 2:
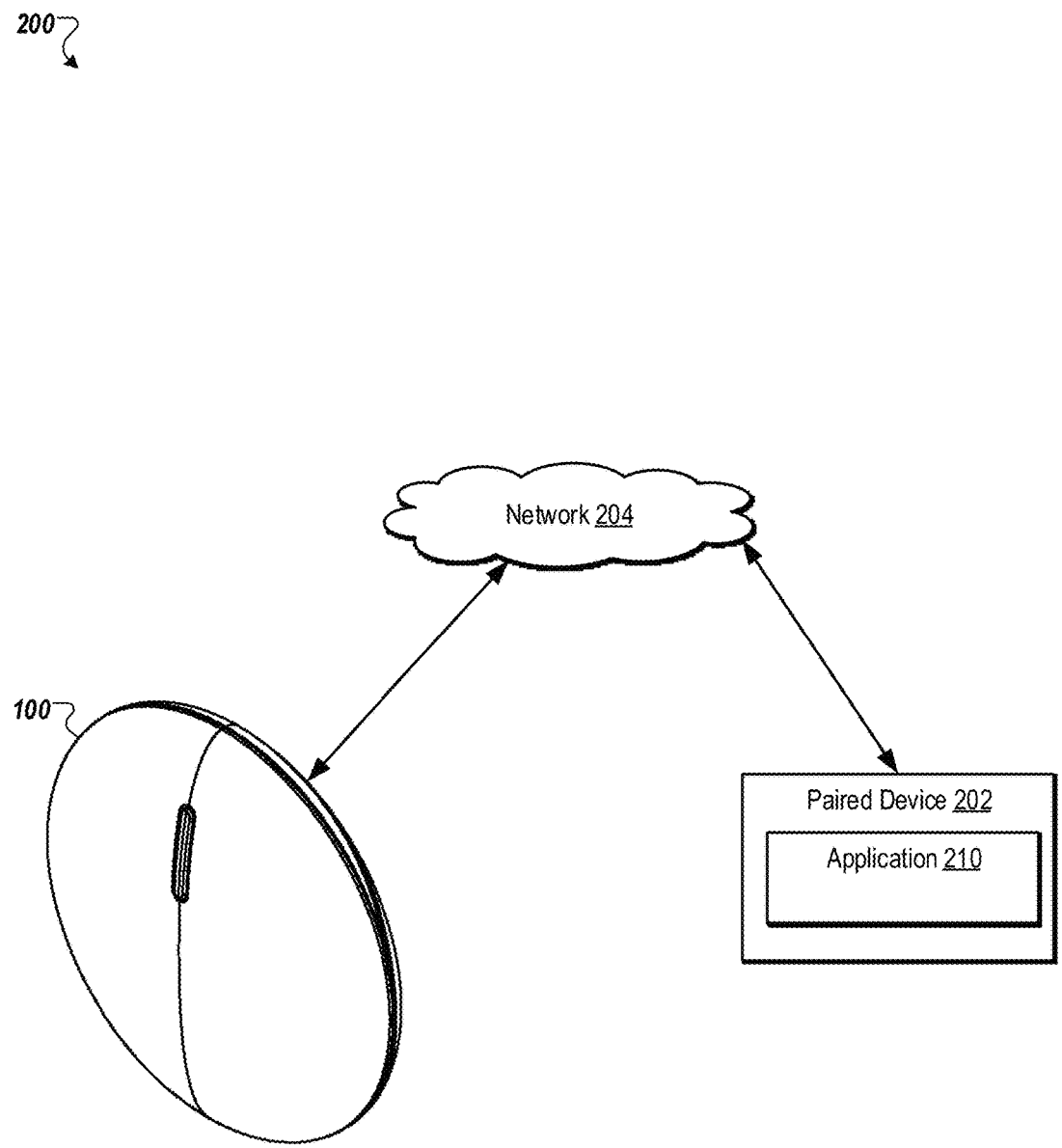
FIG. 2 is a diagram illustrating one embodiment of a basic system including the motion sensing device of FIG. 1A and a paired device.

FIG. 2 is a diagram illustrating one embodiment of a system 200 including the motion sensing device 100 of FIG. 1A and a paired device 202. The system 200 may include the motion sensing device 100, coupled to a paired device 202 via a network 204.

The paired device 202 may include a processor-based computing system. The paired device 202 may include memory, a processor, and network communication capabilities. In the operating environment 100, the paired device 202 may be capable of communicating and receiving data and information to and from the motion sensing device 100 via the network 204. Some examples of the paired device 202 may include a mobile phone, a smartphone, a tablet computer, a laptop computer, a desktop computer, a set-top box, a virtual-reality device, a wearable device, or a connected device, etc.

The network 204 may include a wired network, a wireless network, or any combination thereof. The network 204 may include any suitable topology, configuration or configurations including a star configuration, token ring configuration, or other configurations. The network 204 may include a local area network (LAN), a wide area network (WAN) (e.g., the Internet), DECT ULE, and/or other interconnected data paths across which multiple devices may communicate. In some embodiments, the network 204 may include a peer-to-peer network. The network 204 may also be coupled to or include portions of a telecommunications network that may enable communication of data in a variety of different communication protocols. In some embodiments, the network 204 includes BLUETOOTH® communication networks (e.g., MESH Bluetooth) and/or cellular communication networks for sending and receiving data including via short messaging service (SMS), multimedia messaging service (MMS), hypertext transfer protocol (HTTP), direct data connection, wireless application protocol (WAP), e-mail, or the like. Further, the network 204 may include WiFi, NFC, LTE, LTE-Advanced, ZigBee®, LoRA®—a wireless technology developed to enable low data rate communications to be made over long distances by sensors and actuators for machine to machine communication and internet of things (IoT) applications—wireless USB, or any other such wireless technology.

The motion sensing device 100 and/or the paired device 202 may be configured to provide alerts responsive to motion detection. Alerts may be set in a variety of ways. In at least one embodiment, alerts may be set using the motion sensing device 100. For example, the motion sensing device 100 may include a user interface that may receive custom alert settings. Alternatively, the alert may be remotely set, adjusted, activated, and saved via an application 210 on the paired device 202. The user interface on the paired device 202 is separate from a user interface on the motion sensing device 100.

For example, in one embodiment, the user interface on the motion sensing device 100 receives input from the user. This input may relate to one or more of turning on/off of the alarm, pairing, connectivity testing, sensor testing, sensor detection sensitivity, switching settings, restoring settings, changing status, or the like. Further, in some embodiments, the input may include pressing (applying force, e.g., tapping) the surface of the motion sensing device 100, wherein a certain number of presses may mean one thing, and another number of presses may mean another thing. For example, in one embodiment, quickly pressing twice the surface of the motion sensing device 100 may mean "continue" or "yes" or "enter," and a single pressing of the surface of the motion sensing device 100 may mean "go back" or "no" or "cancel." Other modes involving haptic manipulation are herein contemplated.

In other embodiments, whether additionally or alternatively, the user interface is located on the paired device 202. The user interface, in conjunction with the application 210, receives input from the user. Such input may include any of the embodiments of input for the user interface with regard to the motion sensing device 100 itself. In a settings menu of the application 210, the application 210 may receive input from the user that indicates which motion sensing device 100 to alarm when movement is detected. In some embodiments, the application 210 may receive input from the user specifying how the application 210 and/or paired device 202 may react or respond when it receives an alarm signal from the motion sensing device 100, whether a sound, light, vibration, etc. is output. In some embodiments, the application 210 may receive input from the user selecting a tolerance of movement that triggers the alarm on the application 210. Additionally or alternatively, an alarm on the motion sensing device 100 itself may also occur and include light or sound or both. In other embodiments, the motion sensing device 100 may receive input, e.g. the pressing of the motion sensing device 100 itself, in order to set the alarm using previously stored settings. The custom alert settings may be transmitted via the network 204 from the paired device 202 to the motion sensing device 100.

When the alarm is set, the motion sensing device 100 allows for an appropriate number of seconds (configurable) to be placed on a target position. While this timer is running, the indicator 107 of the motion sensing device 100 may blink. After the timer has stopped running, an alert may alarm according to the respective user-set configuration. In some embodiments, the application 210 may receive input from the user, such as pressing a button in the application 210 on the paired device 100, which may cancel a triggered alarm. In other embodiments and if configured to do so, the motion sensing device 100 may receive an input from the user, such as pressing the motion sensing device 100, to thereby cancel the alarm. The motion sensing device 100 may then notify the application 210 to turn off the alarm. Similarly, in some embodiments, an application 210 may receive an input from the user to un-set, remove, or disable, an alarm, such input including the pressing of an appropriate button in the application 210 of the paired device 100; and in other embodiments, the motion sensing device 100 may receive input from the user to remove or disable an alarm, such input including the pressing of the motion sensing device 100 itself. In either of these embodiments, the new state (being no alarm is set) is transmitted to either the application 210 or the motion sensing device 100 via the network 204, depending on which received the input first from the user.

In some embodiments where multiple motion sensing devices 100 are used, the application 210 of the paired device 100 may receive input from the user that may determine which motion sensing device 100 is selected and set any motion alarms on the selected motion sensing device 100.

The motion sensing device 100 can also include the circuitry needed to allow the motion sensing device 100 to provide an electrical signal to a remotely, properly configured paired device 202, such as a smart watch, fitness tracker or cellphone. To configure the motion sensing device 100, in some embodiments, the wireless network may petition the user to first identify his/her self and/or complete a registration process so that the wireless network, connected to the motion sensing device 100, may identify the user, user account, access code, and/or a device of the user.

In some embodiments, the motion sensing device 100 may receive input from the user to electronically wake the motion sensing device 100, such input including pressing and holding the motion sensing device 100 for an appropriate number of seconds. When awakened, the motion sensing device 100 may broadcast its presence, such as via a wireless protocol (e.g. Bluetooth). In some embodiments, the range of the electrical signal can be reduced in order to reduce the risk of eavesdropping. Upon identification and acceptance of the motion sensing device 100 to the network 204 and/or paired device 202, the motion sensing device 100 may be added to a user interface, which may be part of the application 210. In some embodiments, the identity of the motion sensing device 100 is stored in a remote storage (e.g., a cloud-based storage) so that it can be used with other mobile devices using the same user credentials. At this point, no other user can operate this particular motion sensing device 100 unless shared by the user. Once the motion sensing device 100 is added, received input from the user at the user interface on the application 210 may remove the motion sensing device 100 such that any user may add the motion sensing device 100. To remove a motion sensing device 100 in some embodiments, the user interface on the paired device 202 may indicate a "Remove" (or similar) button that the user may press to remove the motion sensing device 100. Similarly, the user may desire to "find"the motion sensing device 100. To "find" a motion sensing device 100 in some embodiments, the user interface on the paired device 202 may indicate a "Find" (or similar) button that the user may press to locate the motion sensing device 100. If within range, the motion sensing device 100 may receive a signal to start beeping or provide some other source-locating indicator. If not within range, in some embodiments the application 210 on a paired device 202 may continually (or some other interval) ping the signal until the motion sensing device 100 receives and acknowledges the signal. In some embodiments, search for the motion sensing device 100 may end upon pressing the motion sensing device 100, while in other embodiments, received input from the user at the application 210 on the paired device 202 may end the search.

The motion sensing device 100 illustrated in the accompanying figures is by way of example only. Any device that has the requisite sensors and capabilities can function as the motion sensing device 100. Thus, for example, a smartphone itself can be the motion sensing device 100, using the various sensors included in the smartphone. In this case, the application 210 can reside on the phone and interface with various internal sensors to perform the functions described.

Figure 3A:
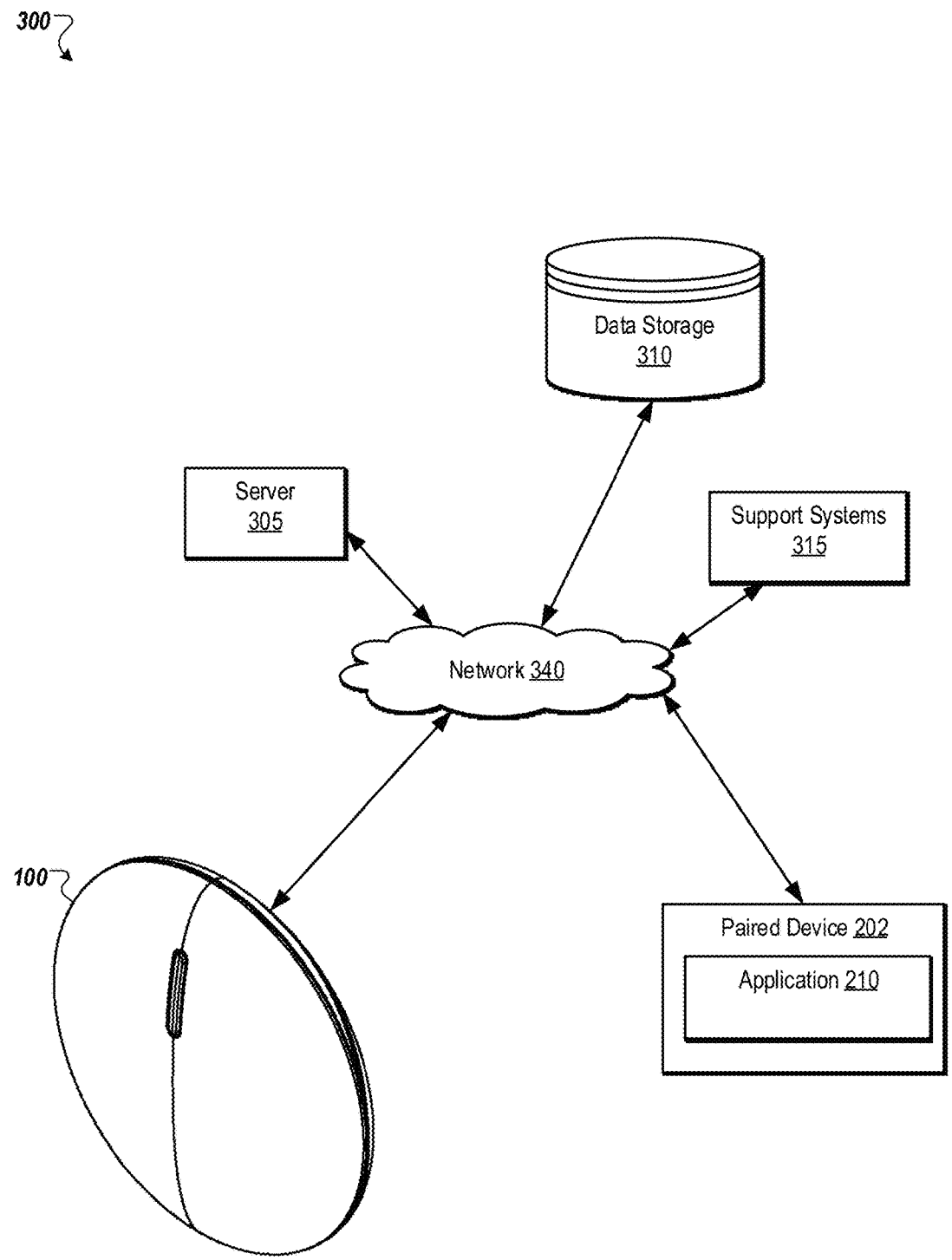
FIG. 3A illustrates a block diagram of an example operating environment for a motion detecting system.
Figure 3B:
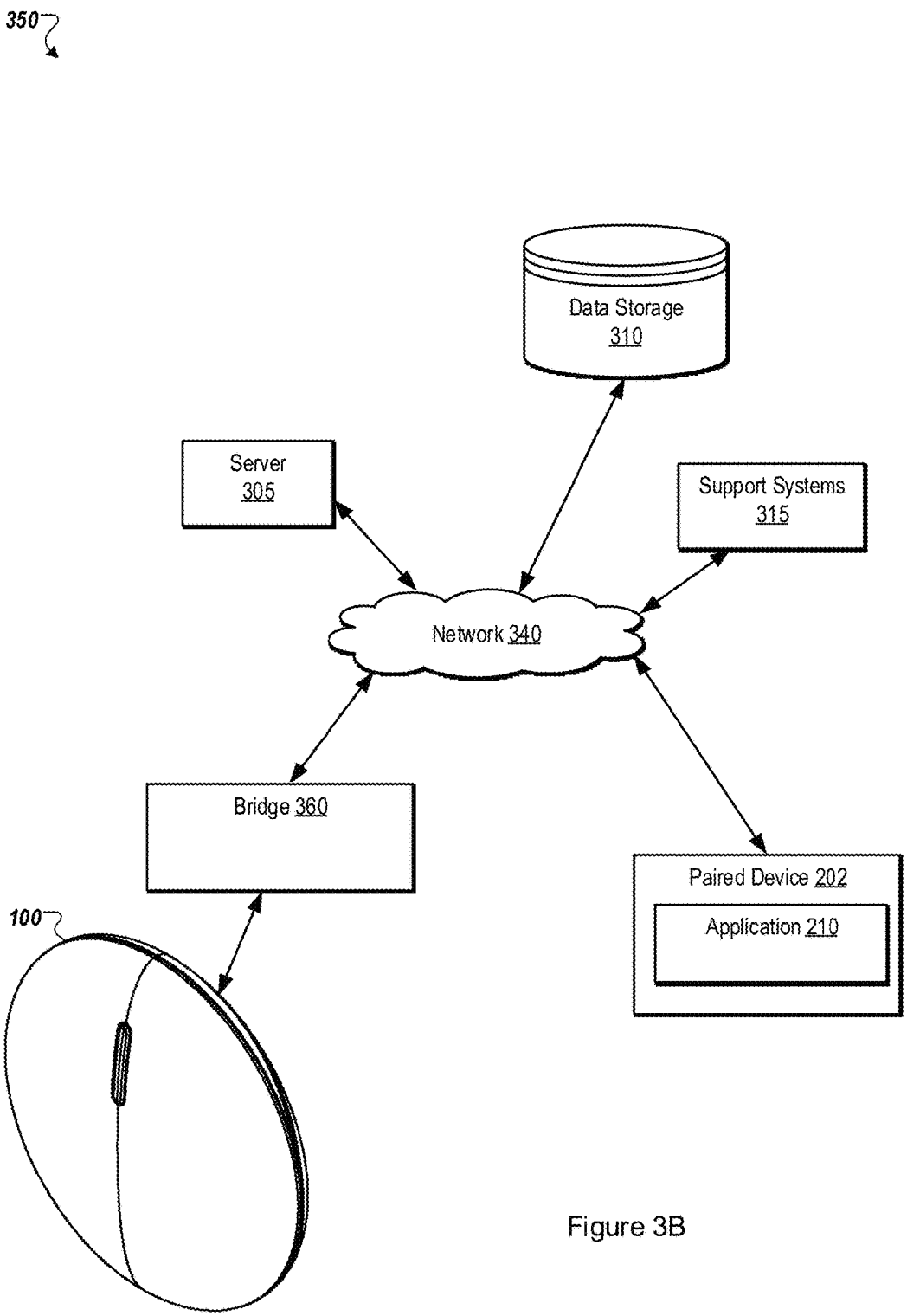
FIG. 3B illustrates a block diagram of another example operating environment of the motion detecting system.

FIGS. 3A and 3B illustrate block diagrams of example operating environments for a motion detecting system. As illustrated and described with respect to FIGS. 3A and 3B, the motion sensing device 100 may be tracked beyond a local mode connection (as in FIG. 2). For example, the motion sensing device 100 may be tracked in a long-distance connect mode for applications beyond local mode capability.

FIG. 3A illustrates an example operating environment 300 that may include the motion sensing device 100, the paired device 202 (which may include the application 210), a server 305 and a data storage 310, each connected via a network 320. The network 320 may be the same or similar as the network 204 of FIG. 2.

The server 305 may include a processor-based computing device. For example, the server 305 may include a hardware server or another processor-based computing device configured to function as a server. The server 305 may include memory and network communication capabilities. In the operating environment 300, the server 305 may be configured to communicate with the motion sensing device 100, the paired device 202, and the data storage 310 via the network 320.

The data storage 310 may include any memory or data storage. The data storage 310 may include network communication capabilities such that the motion sensing device 100, the paired device 202 and the server 305 may communicate with the data storage 310. In some embodiments, the data storage 310 may include computer-readable storage media for carrying or having computer-executable instructions or data structures stored thereon. The computer-readable storage media may include any available media that may be accessed by a general-purpose or special-purpose computer, such as a processor. For example, the data storage 310 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 310. The data storage 310 may store various data. The data may be stored in any data structure, such as a relational database structure. For example, alert settings, user identifiers, device identifiers, device associations, user profiles, device locations, device settings, and other data may be stored in the data storage 310.

In some embodiments, one or more elements within the paired device 202 and/or the server 305 are programmed to receive beacon frames from the motion sensing device 100. For each beacon frame, the same element(s) above that received the beacon frame extracts the RSSI (received signal strength indication) value such that the RSSI and the motion sensing device 100 IDs are transmitted to the server 305 where a position of the motion sensing device 100 may be calculated using triangulation, trilateration, multilateration, and the like as described. The application 210 on the paired device 202 or some other system can show where the motion sensing device 100 is located based on the calculated postion. For example, upon registration and configuration of the motion sensing device 100, which then subsequently becomes out of range from the application 210 on the paired device 202, the application 210 communicates with the motion sensing device 100 through a cloud service, e.g. using the server 305.

For example, in some embodiments the application 210 may communicate directly with the motion sensing device 100 via the network 320. In other embodiments, the application 210 may communicate with the motion sensing device 100 via a network connection in addition to one or more components, including the server 305. Regarding the server 305, in some embodiments certain configured events that reach the server 305 can, in turn, trigger events described in surrounding support systems 315. Such support systems 315 may include but are not limited to camera/video surveillance, door locks, security systems in general, speaker systems, smart televisions, smart thermostats, voice recognition devices (e.g. Amazon Echo®), web-player/application based media interfaces (e.g. Spotify®, Pandora®, etc.), and the like. Triggering events that may engage the previously mentioned surrounding support systems 315 may include events such as the motion sensing device 100 detecting one or both of motion and inactivity. In some embodiments, the sensitivity of detection is dependent on a configurable degree, quantity, or level of motion and/or inactivity in a user-specified period of time.

An algorithm included in the application 210 on the paired device 202 may analyze the received signal to determine if a problem exists, or something else. Any of the above-contemplated applications for the motion sensing device 100 also work when the motion sensing device 100 is out of range of the application 210 and the paired smart device 202. For example, the detected movement may be consistent with a bumpy train ride, or some other kind of explainable movement. Thus, the application 210 can combine other data such as GPS data, to determine, e.g., that the individual is indeed on or moving along a train route; schedule information, to determine, e.g., that this is the time of day the person travels to or from work; or data from other sensors included, e.g., in the paired device 202 to help the application 210 determine whether the movement is explainable or an irregular kind of movement that would occur if someone were trying, e.g., to steal the person's purse or something therein. In other embodiments, the wireless network may include IPS (indoor positioning system) data to more effectively monitor with finer resolution the motion sensing device 100 (e.g. the individual or object to which the motion sensing device 100 is attached to) inside a building, including data such as radio waves, magnetic fields, acoustic signals, or other sensory information collected by mobile devices.

In another example embodiment, a factory owner user may track high value products, such as products on a pallet, and track the pallet via the motion sensing device 100 anywhere throughout the world. For instance, a user may apply the motion sensing device 100 for a variety of purposes pertaining to inventory management. In some embodiments, the user may share the tracking capabilities with the clients/customers, thus providing status updates to the clients/customers as to where in the production/logistics phase their ordered pallet of products is positioned. The motion sensing device 100 may perform such tracking via local mode motion detection and out-of-range/long-range communication described above. In one embodiment, the user may share the tracking capabilities with the clients/customers via the motion sensing device 100 and/or its corresponding ID, while in other embodiments via the server 305 or other system component.

In another example embodiment, a pharmacy owner user may want to ensure all expensive drugs are monitored. For example, the user may activate the motion sensing device 100 and attach it to a targeted drug jar. An application 210 dedicated to an enterprise may be used, mandating all staff members in the pharmacy to install the enterprise application 210 on their mobile devices. Every time an authorized staff uses the drug jar with the motion sensing device 100 protection, an automatic log may be created for the particular staff member, thus creating an automatic tracking log for that specific drug jar. If at any time an unauthorized user touches or moves the drug jar with the attached motion sensing device 100 protection, an immediate alarm may be triggered on all authorized users' phones.

If the movement of the motion sensing device 100 is deemed suspicious, the application 210 may also generate an alert. This can include visual, audible, or other signals generated by the paired device 202, triggering an audible or visual signal on one or more of the paired device 202, the application 210, and the motion sensing device 100. If the information is routed to a server 305, the server can cause a call, text, etc., to be sent to the user. The application 210 can also be configured to activate an alert in the form of a vibration, sound, image or text on a devise such as a smart watch, fitness tracker, computer, tablet or mobile phone.

In certain embodiments, the sensitivity of the motion sensing device 100 can be manually adjusted. For example, the application 210 can provide a digital gauge, such that it can be set to smoothly increase or decrease the sensitivity of the sensor. Thus, for example, when the user boards a train, the user can manually lower the sensitivity so that the train movement does not trigger a warning.

Further, the application 210 alert settings can be personalized and set so that the transmitted signal from the accelerometer/gyro sensor can trigger a vibration (various strengths), a sound (pre chosen songs/music or self-recorded sounds like "don't touch my bag"), an image (from the camera function or image library) or a text signal to alert the user that something that should not be moving is actually moving.

According to FIG. 3B, in some embodiments, an example operating environment 350 may include a bridge 360, which may function as a range extender in situations where the motion sensing device 100 and the paired device 202 may be out of range. The bridge 360 may communicate with the motion sensing device 100 via any wired or wireless connection. In an example, the bridge 360 may communicate with the motion sensing device 100 via a short-range wireless protocol and the bridge 360 may communicate with the network 320 via a wired connection. In another example, the bridge 360 may communicate with the motion sensing device 100 via a wired connection and the bridge 360 may communicate with the network 320 via a wireless protocol, such as Wi-Fi™. In yet another example, the bridge 360 may communicate with the motion sensing device 100 via a first wireless protocol and the bridge 360 may communicate with network 340 via a second wireless protocol.

In some embodiments, the bridge 360 may be programmed to receive beacon frames from the motion sensing device 100. For each beacon frame, the bridge 360 extracts the RSSI (received signal strength indication) value such that the RSSI and the motion sensing device 100 IDs are transmitted to the server 305 where a position of the motion sensing device 100 may be calculated using triangulation, trilateration, multilateration, and the like as described above.

In some embodiments, the motion sensing device 100 may be unable to directly connect to the network 320, the server 305, or any other component due to reasons such as theft, forgetful neglect, misplacement, connectivity issues, and the like. In such cases, the motion sensing device 100 may connect to the network 320, the server 305, and/or other component via another nearby motion sensing device 100 that is actually connected to the network 320, the server 305, or other component. In this manner, the motion sensing device 100 may provide or connect to a mesh network system. For example, the motion sensing device 100 attached to a stolen purse traveling down an interstate highway may not be connected to the network 320 or the server 305, and thus is unable to provide its position to the rightful user. However, when a passing car carrying a connected motion sensing device 100 comes within range of the stolen purse, for example, the motion sensing device 100 attached to the stolen purse may connect and transmit through the nearby connected motion sensing device 100 its position and/or any relevant data. In some embodiments, transmission may occur such that the stolen motion sensing device 100 does not alert the other motion sensing device (e.g., and the thief), and in other embodiments, such that the stolen motion sensing device 100 does alert the thief that he/she is in wrongful possession of the purse.

FIGS. 4A-4L illustrate example screens for a user interface for an application 210 implemented on a paired device 202 via a display device 410. FIGS. 4B-4L illustrate various example screens that may be implemented within or outside of the application 210. Any of the example screens may include a header and footer. In at least one embodiment and as illustrated, a footer may at least partially be used for navigation to different screens. As illustrated, the footer includes a "My Stilla" navigation tool, an "add Stilla" tool, and a "profile" tool.

Figure 4A:
FIGS. 4A-4L illustrate example screens for a user interface for a motion detecting system application implemented on a paired device.
Figure 4B:
Figure 4C:
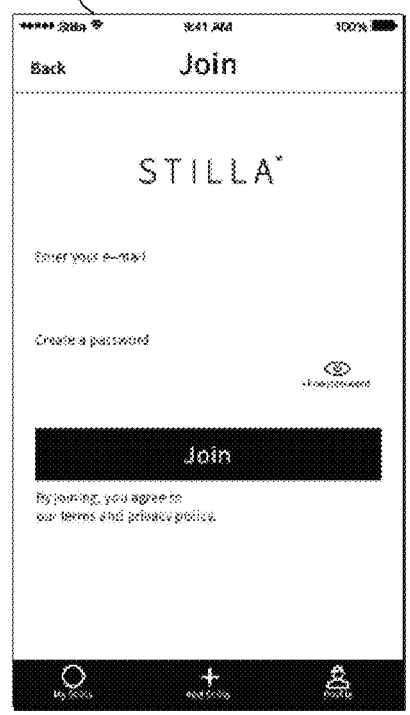
Figure 4D:
Figure 4E:
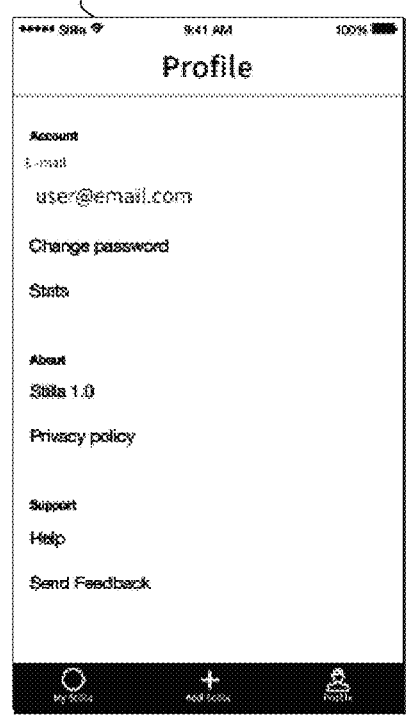

FIG. 4B illustrates an example welcome screen 415 that includes a tool to login or create a new account. FIG. 4C illustrates an example create account screen 420. FIG. 4D illustrates an example login screen 425 for users who already have an account. FIG. 4E illustrates an example profile screen 430. Users may navigate to screen 430 using the "profile" tool, for example.

Figure 4F:
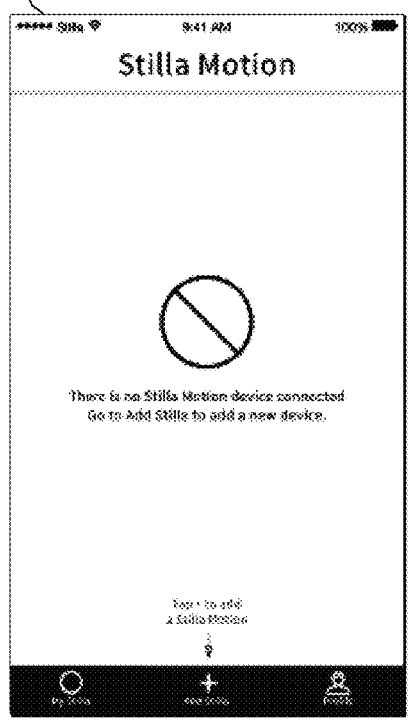
Figure 4G:
Figure 4H:
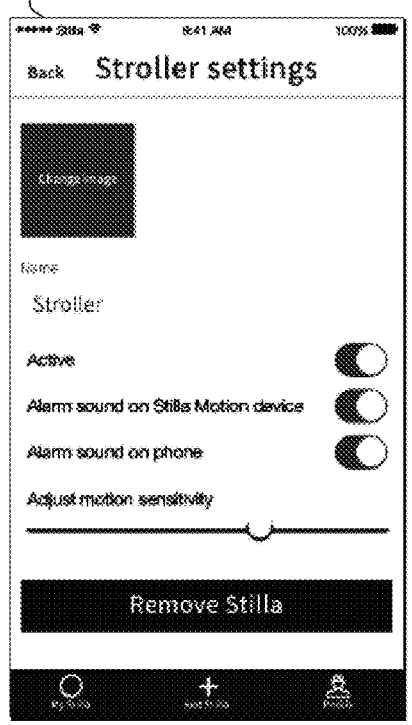

FIG. 4F illustrates an example home screen 435. Users may navigate to home screen 435 using the "My Stilla" tool, for example. As illustrated in FIG. 4F, no motion sensing devices have been associated with a particular user account. Users may add a motion sensing device to the account by using the "add Stilla" tool, for example. FIG. 4G illustrates another example home screen 440 where multiple motion sensing devices have been associated with the user account. As illustrated, motion sensing devices associated with a stroller, handbag, bedroom door, cookie jar, kitchen window, bike, etc. have been associated with the user account. Any number of motion sensing devices may be associated with the particular user account. In at least one embodiment, the descriptions or names of the motion sensing devices may be editable. FIG. 4H illustrates an example motion sensing device screen 445. As illustrated, the example motion sensing device screen 445 is for the stroller of FIG. 4G. Various tools and settings for the motion sensing device may be included, such as an active/deactivate toggle, an alarm sound on motion sensing device tool, an alarm sound on the paired device tool, an option to adjust sensitivity of the motion sensing device, etc. A remove tool may also be used to dissociate the motion sensing device with the user account.

Figure 4I:
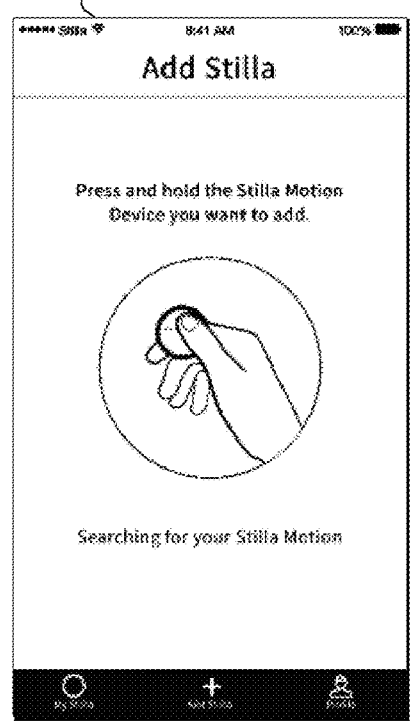
Figure 4J:
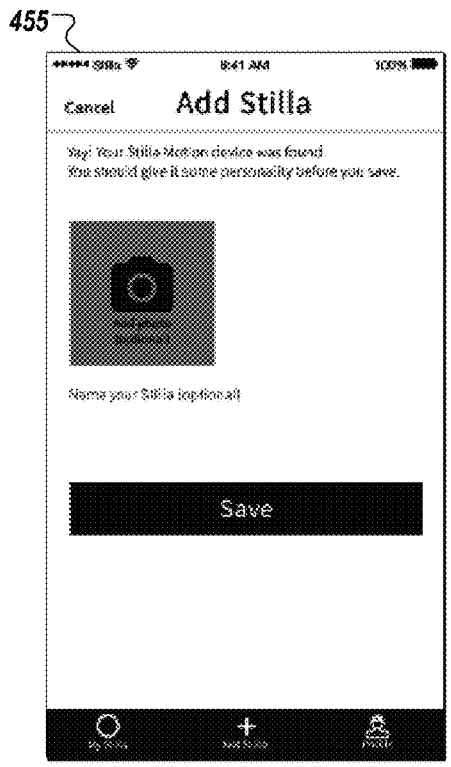

FIG. 4I illustrates an example add screen 450, where a motion sensing device may be associated with a user account. FIG. 4J illustrates an example add confirmation screen 455, that may inform a user that the motion sensing device of FIG. 4I was found and will be added to the user account. In at least one embodiment, a photo may be uploaded by the user.

Figure 4K:
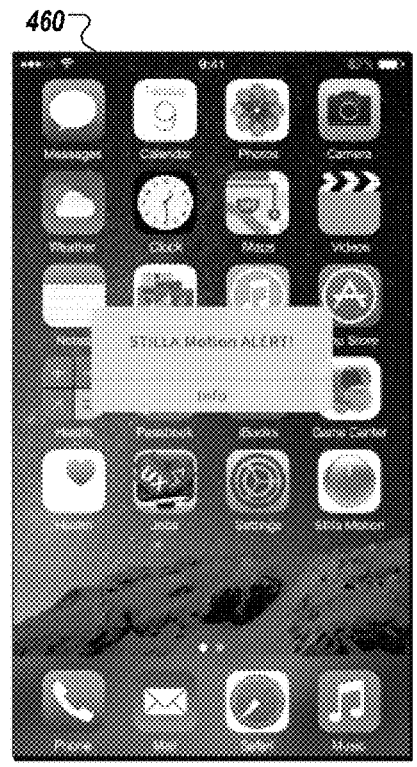
Figure 4L:
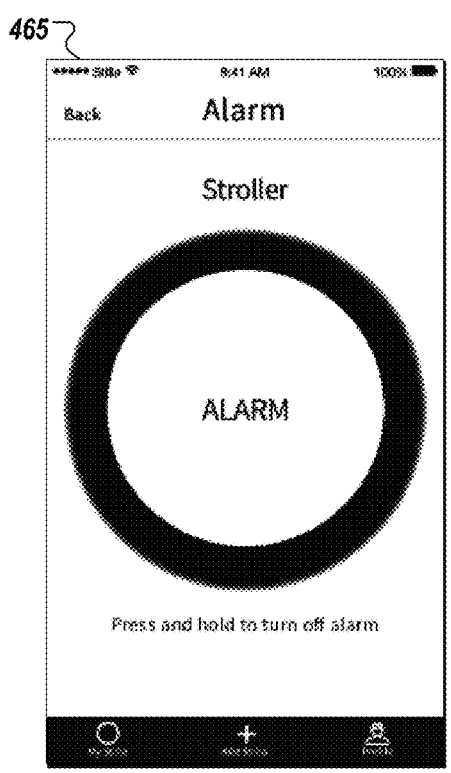

FIG. 4K illustrates an example alert screen 460 on a paired device outside of the application 210. FIG. 4L illustrates another example alert screen 465 on a paired device within the application 210.

In an example, in some embodiments the user interface may include an alert notification. The alert notification may involve any of the human senses and may overtake any current task such that the alert notification must be acknowledged before continuing with an original task. In other embodiments, the user need not acknowledge the alert notification before continuing the task. The alert notification may include statistics, time, date, potential reasons for the alert notification, an array of desired responses, and the like. Additionally and/or alternatively, the user interface may include a variety of colors, shapes, and visual effects so as to provide simple use, rapid and/or easy assessment of information, and peace of mind. In some embodiments, the user interface may conform, as necessary, to application standards provided by various phone carriers and operating systems, thus providing for further ease of use, familiarity, and access with respect to the application 210 and its user interface.

For example, in some embodiments, the user interface on the paired device 202 receives input from the user. This input may relate to one or more of turning on/off of the alarm, pairing, connectivity testing, sensor testing, sensor detection sensitivity, switching settings, restoring settings, changing status, or the like. Further, in some embodiments, the input may include pressing (applying force, e.g., tapping) the surface of the motion sensing device, wherein a certain number of presses may mean one thing, and another number of presses may mean another thing. For example, in one embodiment, pressing or sliding a certain button on the user interface may indicate "continue" or "yes" or "enter," and likewise another button may indicate "go back" or "no" or "cancel." Other modes involving haptic manipulation are herein contemplated.

Additionally or alternatively, the user interface may permit voice-activated input. For example, the user interface may provide an alert notification with a corresponding request for a voice response or some other vocal signal, sound, or communication programmed as acknowledgement of the alert notification. In some embodiments, different vocal inputs may indicate "continue" or "yes" or "enter," and likewise another vocal input indicating "go back" or "no" or "cancel." Other modes involving voice or sound input are herein contemplated.

Figure 5:
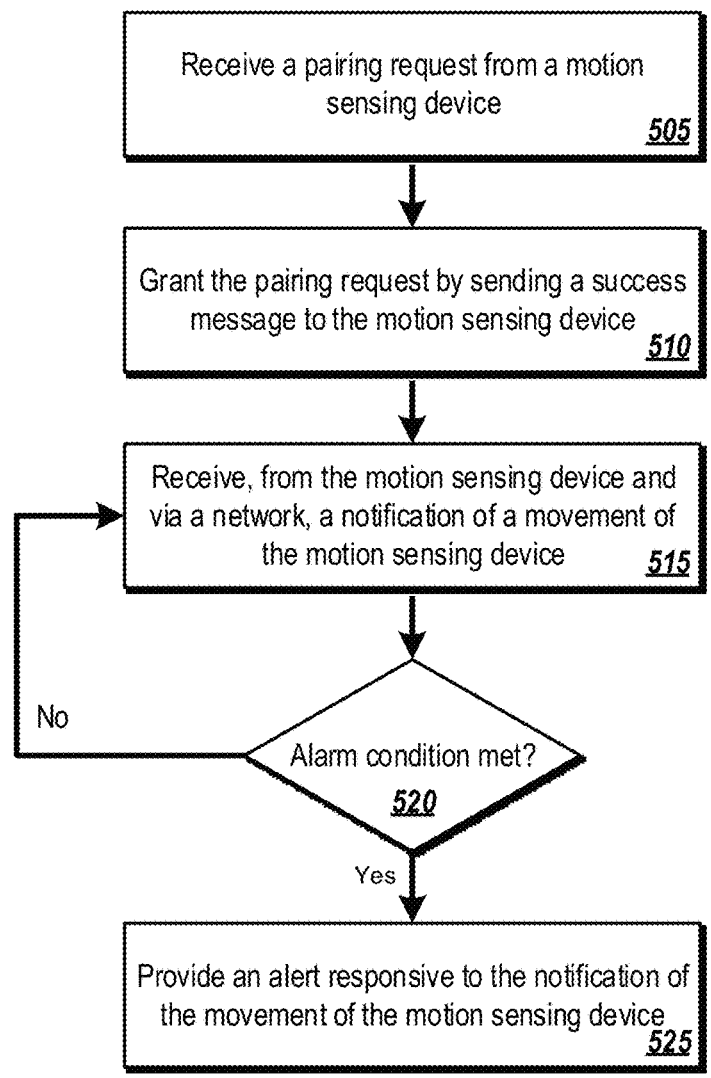
FIG. 5 illustrates a flow diagram of an example method of motion detection.

FIG. 5 illustrates a flow diagram of an example method 500 of motion detection. The method 500 may be performed by processing logic that may include hardware (circuitry, dedicated logic, etc.), software (such as is run on a general purpose computer system or a dedicated machine), or a combination of both, which processing logic may be included in the motion sensing device 100, the paired device 202, the server 305, or the bridge 360 of FIGS. 3A and 3B, or another computer system or device. However, another system, or combination of systems, may be used to perform the method 500. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 500 may begin at block 505, where the processing logic may receive a pairing request from a motion sensing device. At block 510, the processing logic may grant the pairing request by sending a success message to the motion sensing device. At block 515, the processing logic may receive, from the motion sensing device and via a network, a notification of a movement of the motion sensing device. At block 520, the processing logic may determine whether an alarm condition has been met in view of the notification of the movement. For example, movement of the motion sensing device may trigger an alarm condition. In another example, when a threshold amount of movement of the motion sensing device is exceeded, then an alarm condition is met. When an alarm condition is met ("YES" at block 520), at block 525, the processing logic may provide an alert responsive to the notification of the movement of the motion sensing device. When an alarm condition is not met ("NO" at block 520), the processing logic may continue to receive notifications.

Figure 6:
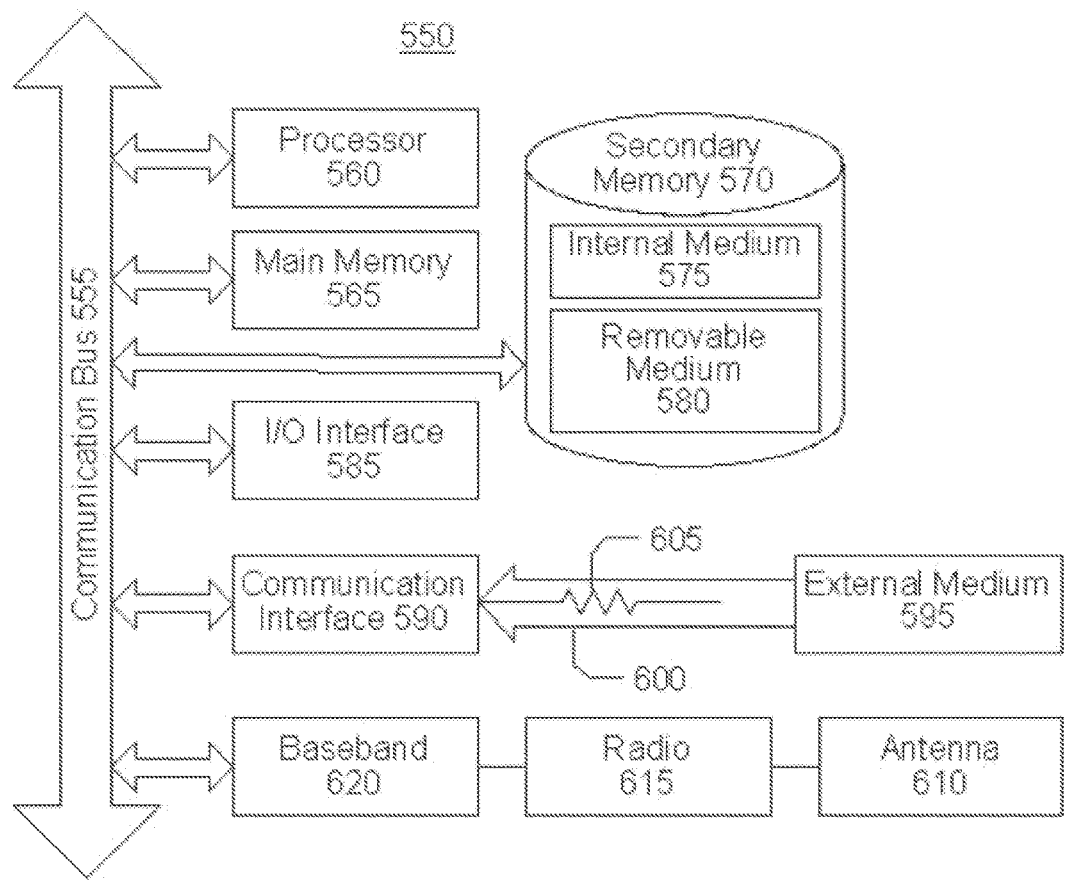
FIG. 6 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 6 is a block diagram illustrating an example embodiment of a generic computer system 650 used in connection with various embodiments described herein. For example, some embodiments may be a wired or wireless system 650. Additionally, in some embodiments the system 650 can be used as or in conjunction with one or more of the mechanisms or processes described above, and can represent components of the system described, the motion sensing device, the paired device 600, the corresponding backend server(s) 680, and/or other devices described herein. The system 650 can be a combination of one or more of the following: a server 680 or any conventional personal computer, or any other processor-enabled device that is capable of wired or wireless data communication. Other computer systems and/or architectures may be also used, as may be clear to those skilled in the art.

The system 650 preferably includes one or more processors, such as processor 660. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 660 is preferably connected to a communication bus 655. The communication bus 655 may include a data channel for facilitating information transfer between storage and other peripheral components of the system 650. The communication bus 655 further may provide a set of signals used for communication with the processor 660, including a data bus, address bus, and control bus (not shown). The communication bus 655 may include any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPM), IEEE 666/S-100, and the like.

System 650 preferably includes a main memory 665 and may also include a secondary memory 670. The main memory 665 provides storage of instructions and data for programs executing on the processor 660, such as one or more of the functions and/or modules discussed above. It should be understood that programs stored in the memory and executed by processor 660 may be written and/or compiled according to any suitable language, including without limitation C/C++, Java, JavaScript, Pearl, Visual Basic, .NET, and the like. The main memory 665 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 670 may optionally include an internal memory and/or a removable medium, for example a floppy disk drive, a magnetic tape drive, a compact disc (CD) drive, a digital versatile disc (DVD) drive, other optical drive, a flash memory drive, etc. The removable medium is read from and/or written to in a well-known manner. Removable storage medium may be, for example, a floppy disk, magnetic tape, CD, DVD, SD card, etc.

The removable storage medium is a non-transitory computer-readable medium having stored thereon computer executable code (e.g., software) and/or data. The computer software or data stored on the removable storage medium is read into the system 650 for execution by the processor 660.

In alternative embodiments, secondary memory 670 may include other similar means for allowing computer programs or other data or instructions to be loaded into the system 650. Such means may include, for example, an external storage medium and a communication interface 690. Examples of external storage medium may include an external hard disk drive or an external optical drive, or and external magneto-optical drive.

Other examples of secondary memory 670 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media and communication interface 690, which allow software and data to be transferred from an external medium to the system 650.

System 650 may include a communication interface 690. The communication interface 690 allows software and data to be transferred between system 650 and external devices (e.g. printers), networks, or information sources. For example, computer software or executable code may be transferred to system 650 from a network server 680 via communication interface 690. Examples of communication interface 690 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 650 with a network or another computing device.

Communication interface 690 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 690 are generally in the form of electrical communication signals. These signals are preferably provided to communication interface 690 via a communication channel. In one embodiment, the communication channel may be a wired or wireless network, or any variety of other communication links. The communication channel carries signals and can be implemented using a variety of wired or wireless communication means including wire or cable, fiber optics, conventional phone line, cellular phone link, wireless data communication link, radio frequency ("RF") link, or infra-red link, just to name a few.

Computer executable code (e.g., computer programs or software) is stored in the main memory 665 and/or the secondary memory 670. Computer programs can also be received via communication interface 690 and stored in the main memory 665 and/or the secondary memory 670. Such computer programs, when executed, enable the system 650 to perform the various functions of the present embodiment as previously described.

In this description, the term "computer readable medium" is used to refer to any non-transitory computer readable storage media used to provide computer executable code (e.g., software and computer programs) to the system 650.

Examples of these media include main memory 665, secondary memory 670 (including internal memory, removable medium, and external storage medium), and any peripheral device communicatively coupled with communication interface 690 (including a network information server 680 or other network device). These non-transitory computer readable mediums are means for providing executable code, programming instructions, and software to the system 650.

In an embodiment that is implemented using software, the software may be stored on a computer readable medium and loaded into the system 650 by way of removable medium, I/O interface 685, or communication interface 690. In such an embodiment, the software is loaded into the system 650 in the form of electrical communication signals. The software, when executed by the processor 660, preferably causes the processor 660 to perform the inventive features and functions previously described herein.

In an embodiment, I/O interface 685 provides an interface between one or more components of system 650 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 650 also includes optional wireless communication components that facilitate wireless communication over a voice and over a data network. The wireless communication components include an antenna system 610, a radio system 615 and a baseband system 620. In the system 650, radio frequency (RF) signals are transmitted and received over the air by the antenna system 610 under the management of the radio system 615.

In one embodiment, the antenna system 610 may include one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may include one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 660. The central processing unit 660 has access to data storage areas 665 and 670. The central processing unit 660 is preferably configured to execute instructions (e.g., computer programs or software) that can be stored in the memory 665 or the secondary memory 670. Computer programs can also be received from the baseband processor and stored in the data storage area 665 or in secondary memory 670, or executed upon receipt. Such computer programs, when executed, enable the system 650 to perform the various functions of the present embodiment as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein may also be apparent to those skilled in the relevant art. Various embodiments may also be implemented using a combination of both hardware and software.

Further, those of skill in the art may appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the various embodiments as a whole. In addition, the grouping of functions within a module, block, circuit or step is for ease of description. Specific functions or steps can be moved from one module, block or circuit to another without departing from the various embodiments as a whole.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

While certain embodiments have been described above, it may be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A system for motion detection comprising:
   a motion sensing device, the motion sensing device comprising:
      an attachment mechanism configured to attach to an object;
      a motion detector configured to detect motion of the object at least in a rotational direction;
      a first short-range wireless communication component configured to communicate motion information related to the detected motion; and
      an indicator; and
   a paired device, comprising:
      a second short range wireless communication component configured to receive the motion information;
      a user interface tool configured to receive an input to set a sensitivity threshold of the motion sensing device to detect the motion of the object in the rotational direction; and
      a sensing algorithm configured to determine whether the motion in the rotational direction and the sensitivity threshold of the motion sensing device are associated with an alarm condition.

2. The system of claim 1, wherein the motion detector is an accelerometer, gyroscope or both.

3. The system of claim 1, wherein the first short range wireless communication component is configured to implement at least one of the following protocols: Bluetooth, Bluetooth Low Power, Bluetooth Smart, WiFi, wireless USB, and NFC.

4. The system of claim 1, wherein the paired device is configured to generate an alarm when the sensing algorithm determines that the motion is associated with the alarm condition.

5. The system of claim 4, wherein the alarm comprises a vibration, a sound, an image, a text signal or some combination thereof.

6. The system of claim 4, wherein the motion sensing device is substantially a shape of a button.

7. The system of claim 1, wherein the motion sensing device further comprises a case configured to substantially encase the motion detector, the short-range wireless communication component, and the indicator, wherein a footprint of the case is smaller than one square inch.

8. A method, comprising:
   providing a user interface that includes one or more tools to adjust one or more settings of a motion sensing device, the one or more tools including an option to set a sensitivity threshold of the motion sensing device;
   receiving, via the one or more tools, an input to set the sensitivity threshold of the motion sensing device;
   receiving, from a motion sensing device and via a network, a notification of a movement of the motion sensing device, wherein the motion sensing device includes:
      a motion detector configured to detect motion of an object at least in a rotational direction;
      a wireless communication component configured to communicate motion information related to the detected motion, and
      an indicator configured to indicate a status of the motion sensing device,
   wherein the notification of the movement includes an identification of the motion sensing device and an indication that the motion sensing device detected the motion of the object in the rotational direction;
   determining, based on the notification of the movement of the object in the rotational direction and the sensitivity threshold of the motion sensing device, that an alarm condition has been met; and
   providing an alert responsive to the determined alarm condition based on the notification of the movement of the object in the rotational direction and the sensitivity threshold of the motion sensing device.

9. The method of claim 8, wherein the motion detector is an accelerometer, gyroscope or both.

10. The method of claim 8 further comprising generating an alarm in response to determining that the notification of the movement is associated with the alarm condition.

11. The method of claim 10, wherein the alert comprises a vibration, a sound, an image, a text signal or some combination thereof.

12. The method of claim 10, wherein the motion sensing device is substantially a shape of a button.

13. The method of claim 8, wherein the motion sensing device further comprises a case configured to substantially encase the motion detector, the short-range wireless communication component, and the indicator, wherein a footprint of the case is smaller than one square inch.

14. A motion sensing device comprising:
   a motion detector configured to detect motion of an object at least in a rotational direction;
   a short-range wireless communication component configured to receive input customizing one or more settings of the motion sensing device and further configured to communicate motion information related to the detected motion in the rotational direction to a paired device, the one or more settings including a sensitivity threshold of the motion sensing device; and
   an indicator configured to indicate an alarm condition determined by the paired device responsive to the motion information and the sensitivity of the motion sensing device.

15. The motion sensing device of claim 14, wherein the motion detector is at least one of an accelerometer or a gyroscope.

16. The motion sensing device of claim 14, where the short-range wireless communication component is configured to implement at least one of the following protocols: Bluetooth, Bluetooth Low Power, Bluetooth Smart, WiFi, wireless USB, and NFC.

17. The motion sensing device of claim 14, where the paired device is configured to generate an alarm when the motion of the object is associated with the alarm condition.

18. The motion sensing device of claim 17, wherein the alarm comprises a vibration, a sound, an image, a text signal or some combination thereof.

19. The motion sensing device of claim 17, wherein the motion sensing device is substantially a shape of a button.

20. The motion sensing device of claim 19 further comprising a case configured to substantially encase the motion detector, the short-range wireless communication component, and the indicator, wherein a footprint of the case is smaller than one square inch.

* * * * *